(12) United States Patent
Schulz et al.

(10) Patent No.: US 8,991,046 B2
(45) Date of Patent: Mar. 31, 2015

(54) MULTI-PART PISTON FOR AN INTERNAL COMBUSTION ENGINE AND METHOD FOR THE PRODUCTION THEREOF

(75) Inventors: Joachim Schulz, Stuttgart (DE); Jochen Kortas, Murr (DE)

(73) Assignee: MAHLE International GmbH, Stuttgart (DE)

( * ) Notice: Subject to any disclaimer, the term of this patent is extended or adjusted under 35 U.S.C. 154(b) by 267 days.

(21) Appl. No.: 13/383,682

(22) PCT Filed: Jun. 29, 2010

(86) PCT No.: PCT/DE2010/000753
§ 371 (c)(1),
(2), (4) Date: Mar. 20, 2012

(87) PCT Pub. No.: WO2011/006469

PCT Pub. Date: Jan. 20, 2011

(65) Prior Publication Data

US 2012/0192828 A1 Aug. 2, 2012

(30) Foreign Application Priority Data

Jul. 14, 2009 (DE) .......................... 10 2009 032 941

(51) Int. Cl.
*B23P 15/10* (2006.01)
*F02F 3/00* (2006.01)
*F02B 23/06* (2006.01)

(52) U.S. Cl.
CPC ............. *F02F 3/003* (2013.01); *F02B 23/0672* (2013.01); *F02B 23/0693* (2013.01); *Y02T 10/125* (2013.01)
USPC ............. 29/888.042; 29/888.044; 29/888.048

(58) Field of Classification Search
CPC .......... B23K 1/19; B23K 15/10; B23K 26/24; B23K 26/28; B23K 2001/12; B23K 2201/003; B23P 15/10; F05C 2201/0448; F02F 3/0015; F02F 3/003; F02F 3/16; F02F 2003/0038; F02F 2003/0053; F02F 2200/04

USPC ......... 29/888.042, 888.044, 888.048; 92/176, 92/212, 231
See application file for complete search history.

(56) References Cited

U.S. PATENT DOCUMENTS 1,722,025 A * 7/1929 Wagener ....................... 228/199
2,943,181 A 6/1960 Fraser et al.
(Continued)

FOREIGN PATENT DOCUMENTS

| DE | 27 30 120 | 1/1979 |
| DE | 10 2007 044 106 | 3/2009 |

(Continued)

OTHER PUBLICATIONS

International Search Report of PCT/DE2010/000753, Dec. 14, 2010.
(Continued)

*Primary Examiner* — Alexander P Taousakis
(74) *Attorney, Agent, or Firm* — Collard & Roe, P.C.

(57) ABSTRACT

The present invention relates to a method for producing a multi-part piston (10, 110) for an internal combustion engine, comprising the following method steps: producing an upper piston part (11) and a lower piston part (12), each having an inner support element (22, 26; 122, 126) having joining surfaces (24, 28; 124, 128) and an outer support element (23, 27; 123, 127) having joining surfaces (25, 29; 125, 129), applying a high-temperature solder material in the area of at least one joining surface (24, 28 or 25, 29; 124, 128 or 125, 129), assembling the upper piston part (11) and the lower piston part (12) to form a piston body by establishing a contact between the joining surfaces (24, 28 or 25, 29; 124, 128 or 125, 129), placing the piston body in a vacuum furnace and evacuating the vacuum furnace; heating the piston body at a pressure of at most $10^{-2}$ mbar to a soldering temperature of at most 1300° C.; cooling the soldered piston (10, 110) at a pressure of at most $10^{-2}$ mbar until the high-temperature solder material is completely solidified. The present invention further relates to a piston (10, 110) that can be produced by means of the method.

7 Claims, 3 Drawing Sheets

(56) References Cited

U.S. PATENT DOCUMENTS

Figure 1:
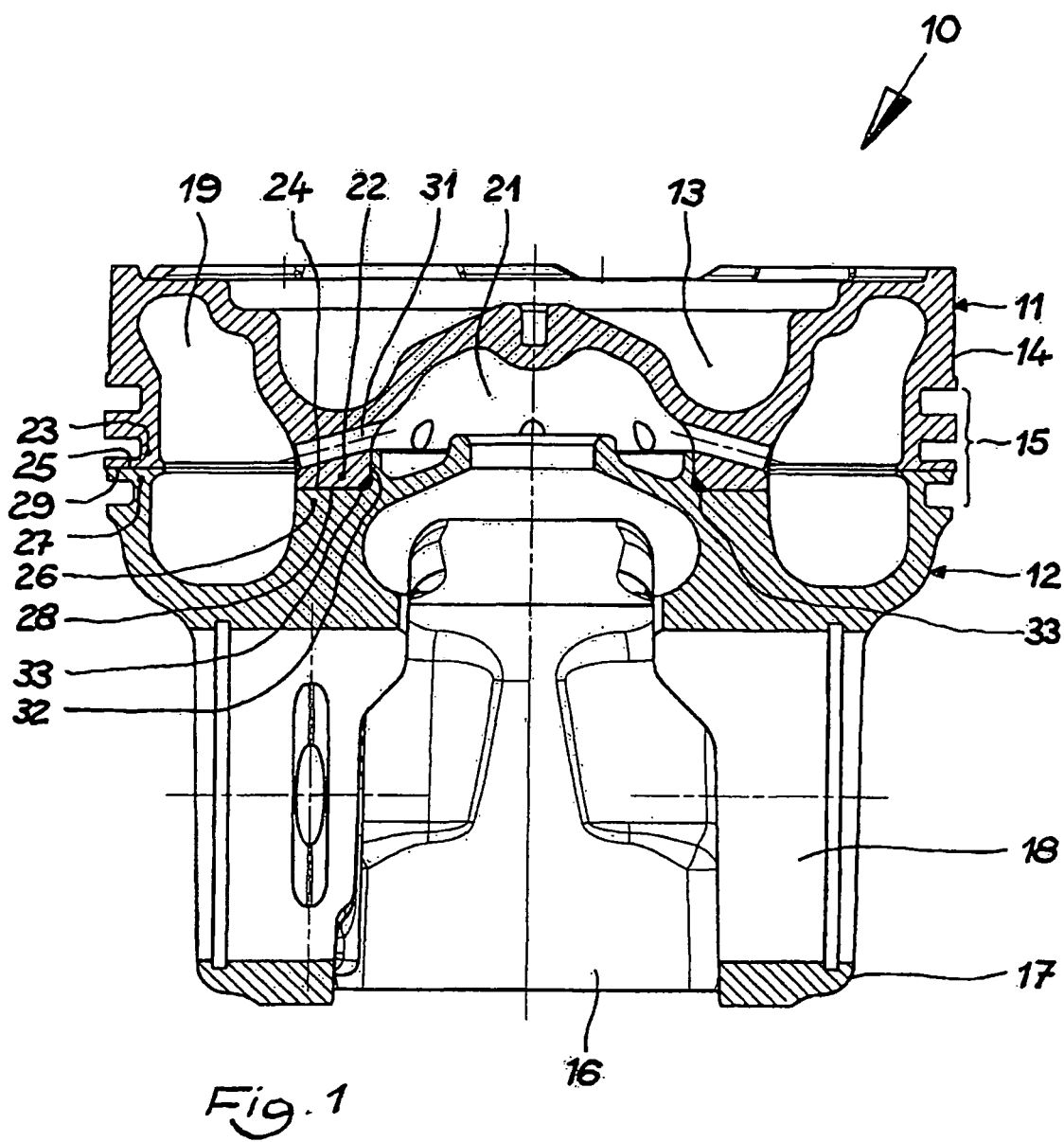

| | | | |
|---|---|---|---|
| 3,613,521 A * | 10/1971 | Itano | 92/186 |
| 4,552,057 A * | 11/1985 | Mizuhara | 92/176 |
| 4,590,901 A * | 5/1986 | Mizuhara | 123/193.6 |
| 4,604,945 A * | 8/1986 | Mizuhara | 92/176 |
| 5,377,901 A * | 1/1995 | Rungta et al. | 228/183 |
| 5,913,960 A * | 6/1999 | Fletcher-Jones | 92/219 |
| 6,763,758 B2 | 7/2004 | Kemnitz et al. | |
| 7,971,355 B2 | 7/2011 | Scharp | |
| 8,074,617 B2 | 12/2011 | Grahle et al. | |
| 8,197,747 B2 * | 6/2012 | Huang | 420/442 |
| 2010/0307445 A1 | 12/2010 | Kortas et al. | |

FOREIGN PATENT DOCUMENTS

| | | |
|---|---|---|
| DE | 10 2007 061 601 | 6/2009 |
| DE | 10 2008 038 325 | 6/2009 |
| EP | 0 232 028 | 8/1987 |
| EP | 1 483 493 | 12/2004 |
| EP | 2 025 441 | 2/2009 |
| FR | 1 170 629 | 1/1959 |
| WO | PCT/DE2008/01394 | 3/2009 |

OTHER PUBLICATIONS

German Search Report dated Jan. 28, 2010 in German Application No. 10 2009 032 941.2 with English translation of relevant parts.
DIN EN 1044, Jul. 1999, total pp. 18.
DIN EN 8513, Apr. 1993, total pp. 18.
DIN EN 10267, Feb. 1998, total pp. 12.

* cited by examiner

MULTI-PART PISTON FOR AN INTERNAL COMBUSTION ENGINE AND METHOD FOR THE PRODUCTION THEREOF

CROSS REFERENCE TO RELATED APPLICATIONS

This application is the National Stage of PCT/DE2010/000753 filed on Jun. 29, 2010 which claims priority under 35 U.S.C. §119 of German Application No. 10 2009 032 941.2 filed on Jul. 14, 2009, the disclosure of which is incorporated by reference. The international application under PCT article 21(2) was not published in English.

The present invention relates to a multi-part piston for an internal combustion engine, as well as to a method for the production of such a piston.

Connecting upper piston part and lower piston part can cause problems, in this connection, as is explained in detail in EP 1 483 493 B1. For example, the upper piston part and the lower piston part can be welded to one another or screwed together with one another, whereby each of these connection techniques has specific advantages and disadvantages. From the international patent application PCT/DE2008/01394, it is furthermore known to connect the upper piston part and the lower piston part with one another by means of a solder material. However, no information is provided with regard to the method parameters.

The task of the present invention consists in making available a simplified soldering method for the production of a multi-part piston, which method guarantees a reliable soldered connection between upper piston part and lower piston part, with the least possible effort.

The solution consists in a method having the characteristics of claim 1, and in a piston that can be produced according to this method.

According to the invention, it is provided that first, an upper piston part and a lower piston part, having an inner support element with joining surfaces and an outer support element with joining surfaces, in each instance, are produced, that furthermore, a high-temperature solder material is applied in the region of at least one joining surface, that the upper piston part and the lower piston part are joined together to form a piston body, by means of production of contact between the joining surfaces, which body is subsequently placed in a vacuum oven and, after evacuation of the vacuum oven, is heated to a soldering temperature of at most 1300° C., at a pressure of at most $10^{-2}$ mbar. Afterward, the soldered piston is cooled at a pressure of at most $10^{-2}$ mbar, until the high-temperature solder material has solidified completely.

By means of the method according to the invention, the desired material properties of the basic material of the piston according to the invention are adjusted, after heating in a vacuum oven, in such a manner that no further heat treatment, particularly no relaxation annealing, is necessary any longer, and the basic material nevertheless has values, particularly with regard to its strength, hardness, and structure morphology, that are as optimal as possible, after the soldering process. The method according to the invention is therefore of short duration and is also more cost-advantageous than the methods known in the state of the art.

Advantageous further developments are evident from the dependent claims.

Fundamentally, all known high-temperature solder materials are suitable. However, solder materials on the basis of nickel, cobalt and/or copper are preferred. An example of a suitable solder material is the nickel-based solder L-BNi2 (according to EN 1044 or DIN 8513). A particularly firm and reliable connection between upper piston part and lower piston part is achieved with this solder material, particularly when using AFP steel.

The method of application of the solder material is up to the discretion of the person skilled in the art. The solder material can be applied to the full area of the at least one joining surface, for example, particularly brushed on or imprinted by means of a stamp. However, the solder material can also be introduced into at least one depot depression disposed in the region of at least one joining surface. In this connection, the at least one depot depression can be configured as a circumferential or straight-line groove or as a depression in the shape of a shallow dome, in particularly simple manner, in terms of production technology.

It is practical if the upper piston part and/or the lower piston part are provided with at least one centering surface, in order to simplify joining upper piston part and lower piston part together, and to guarantee the correct orientation of upper piston part and lower piston part relative to one another, in particularly simple manner. To optimize the solder connection, the at least one centering surface can also be provided with solder material. Particularly if the at least one centering surface hits a joining surface at an angle, it is practical if the solder material is applied at an angle.

The piston body is heated in the vacuum oven, preferably to a soldering temperature of at least 1000° C., in order to achieve an optimal distribution of the solder material by means of the capillary forces that are in effect during the soldering process. It is practical to keep the soldering temperature constant over at least 5 min.

The method according to the invention is suitable for all multi-part pistons. For example, ring-shaped inner support elements can be provided, which delimit an outer circumferential cooling channel and an inner cooling space. However, central inner support elements can also be provided, which delimit an outer circumferential cooling channel that extends over a large region below the piston crown. In both cases, a particularly good cooling effect is brought about by the cooling oil that circulates in the cooling channel or cooling space.

The piston according to the invention preferably consists of a steel basic material with a ferrite-pearlite structure, for example an AFP steel. The hardness of the basic material aimed at with the method according to the invention preferably amounts to 230 HB to 300 HB.

Figure 2:
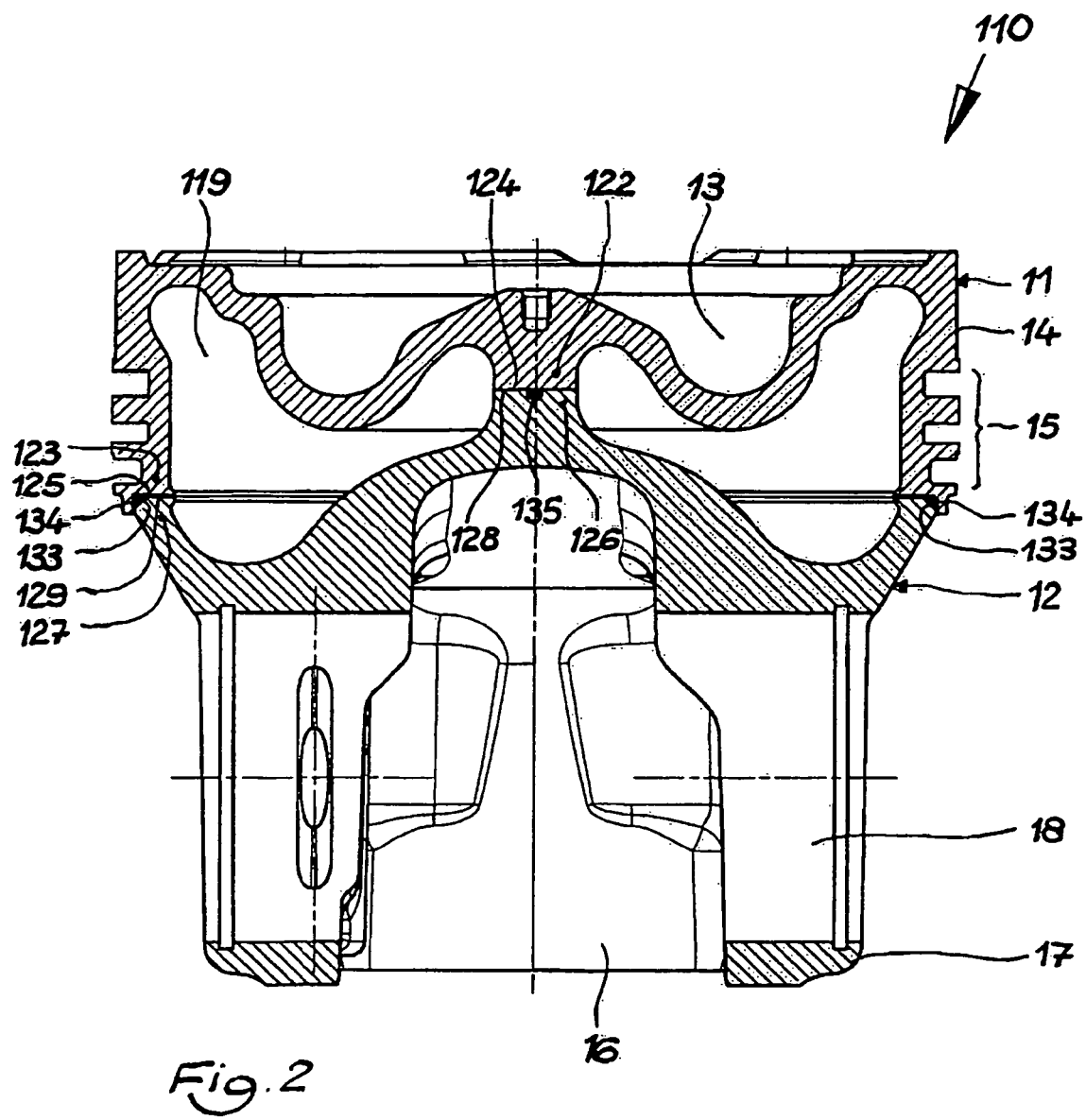
Figure 3:
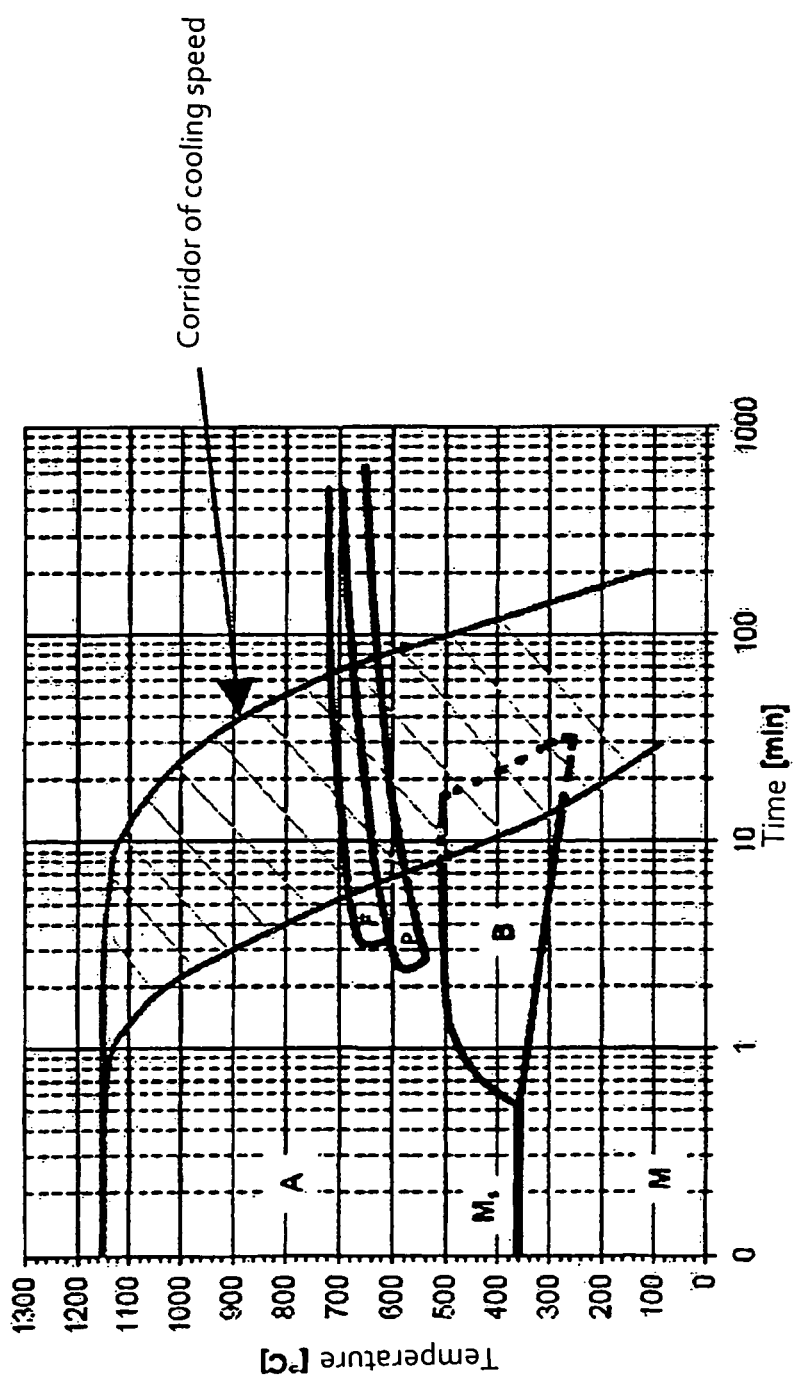

Exemplary embodiments of the invention will be described in the following, using the attached drawings. These show, in a schematic representation, not true to scale:

FIG. 1 a section through a first exemplary embodiment of a piston according to the invention;

FIG. 2 a section through a second exemplary embodiment of a piston according to the invention;

FIG. 3 a temperature/time diagram of the cooling phase of the method according to the invention.

FIG. 1 shows a first exemplary embodiment of a piston 10 according to the invention, in a representation as a composite piston body before the soldering process. The piston 10 is composed of an upper piston part 11 and a lower piston part 12, which are forged from AFP steel in the exemplary embodiment. The upper piston part 11 has a combustion bowl 13, a circumferential top land 14, and a circumferential ring belt 15. The lower piston part 12 has a piston skirt 16 and pin bosses 17 having pin bores 18 for accommodating a piston pin (not shown). The upper piston part 11 and the lower piston part 12 form a circumferential outer cooling channel 19 and a central inner cooling space 21.

The upper piston part 11 has an inner support element 22 and an outer support element 23. The inner support element 22 is disposed on the underside of the upper piston part 11, in ring shape, and has a joining surface 24. The inner support element 22 furthermore forms part of the circumferential wall of the inner cooling space 21. The outer support element 23 of the upper piston part 11 is configured within the ring belt 15, in the exemplary embodiment, and has a joining surface 25. The inner support element 22 furthermore has overflow channels 31 for allowing cooling oil to pass over from the outer cooling channel 19 into the inner cooling space 21.

The lower piston part 12 also has an inner support element 26 and an outer support element 27. The inner support element 26 is disposed on the top of the lower piston part 12, circumferentially, and has a joining surface 28. The inner support element 26 furthermore forms part of the circumferential wall of the inner cooling space 21. The outer support element 27 is configured within the ring belt 15, in the exemplary embodiment, and has a joining surface 29. The inner support element 26 furthermore has a circumferential centering surface 32, which stands at a right angle on the joining surface 28 in the exemplary embodiment. Furthermore, a circumferential collar can be applied to the lower piston part 12, with which the joining surface 29 is radially widened and offers a larger surface area for application of the solder material. The collar is removed again after the soldering process, for example during final machining of the piston (not shown).

In FIG. 1, the piston 10 is shown as a composite piston body before the soldering process. In this exemplary embodiment, the high-temperature solder material is applied in the form of a solder depot 33, into the angle between joining surface 28 and centering surface 32 of the inner support element 26 of the lower piston part 12. The solder material can be applied as a circumferential solder depot 33 or in the form of multiple dot-shaped or line-shaped solder depots. In addition, in the exemplary embodiment, solder material in the form of a very thin layer is applied to at least one of the outer joining surfaces 25 or 29 of the upper piston part 11 and/or lower piston part 12 (not shown). However, this is not absolutely necessary. In another variant, the solder material can also be applied exclusively over the area of the joining surfaces, without providing solder depots.

Subsequently, the upper piston part 11 and the lower piston part 12 are brought into contact along their joining surfaces 24, 25 and 28, 29, respectively, and joined together to form a piston body, whereby the centering surface 32 guarantees the correct orientation of upper piston part 11 and lower piston part 12.

FIG. 2 shows a second exemplary embodiment of a piston 110 according to the invention in a representation as a composite piston body before the soldering process. The piston 110 essentially corresponds to the piston 10 according to FIG. 1.

The most important difference consists in that the upper piston part 11 and the lower piston part 12 form only a circumferential outer cooling channel 119. For this purpose, the upper piston part 11 has an inner support element 122, which is disposed centered on the underside of the upper piston part 11 and having a joining surface 124. Accordingly, the lower piston part 12 has an inner support element 126 that is disposed centered on the top of the lower piston part 12 and provided with a joining surface 128. The resulting cooling channel 119 accordingly extends particularly far below the combustion bowl 13, so that an efficient cooling effect is obtained.

Another difference consists in that in this exemplary embodiment, the outer support element 123 of the upper piston part 11 is configured below the ring belt 15. The outer support element 123 has a joining surface 125 and a circumferential centering surface 134, which stands at a right angle on the joining surface 125 in the exemplary embodiment. The outer support element 127 of the lower piston part 12 is accordingly also configured below the ring belt 15 and has a joining surface 129.

In FIG. 2, the piston 110 is also represented as a composite piston before the soldering process. In this exemplary embodiment, the high-temperature solder material is applied into the angle between joining surface 125 and centering surface 134 of the outer support element 123 of the upper piston part 11, in the form of a solder depot 133. The solder material can be applied as a circumferential solder depot 133 or in the form of multiple dot-shaped or line-shaped solder depots. Furthermore, in this exemplary embodiment, a further solder depot 135 in the shape of a shallow dome, filled with solder material, is provided in the joining surface 128 of the central support element of the lower piston part 12.

Subsequently, the upper piston part 11 and the lower piston part 12 are brought into contact along their joining surfaces 124, 125 and 128, 129, respectively, and joined together to form a piston body, whereby the centering surface 134 guarantees the correct orientation of upper piston part 11 and lower piston part 12.

The soldering method for production of the pistons 10, 110 was carried out as follows in this exemplary embodiment. The AFP steel 38MnVS6 according to DIN-EN10267 and material number 1.1303 was selected as the basic material. The nickel-based solder L-BNi2 according to EN 1044 or DIN 8513 was selected as the high-temperature solder material. The composition of this solder material amounts to 7 wt.-% chromium, 3.1 wt.-% boron, 4.5 wt.-% silicon, 3 wt.-% iron, and maximally 0.06 wt. 0% carbon, as well as nickel up to 100 wt.-% (all percentages given with reference to the solder material). The range of the melting temperature along the solid/liquid line in the melt diagram amounts to 970° C. to 1000° C. The range of the solder temperature amounts to 1010° C. to 1180° C.

The piston bodies were placed into a known high-temperature vacuum oven with a cooling gas apparatus. The vacuum oven was evacuated until a pressure of about $5 \times 10^{-3}$ mbar had been reached. Then the vacuum oven was heated to a soldering temperature of 1150° C. The pressure amounted to at most $10^{-2}$ mbar during the heating-up phase. In the exemplary embodiment, the soldering temperature was kept constant for 15 min to 60 min, whereby the pressure dropped to about $5 \times 10^{-4}$ mbar. Then the vacuum oven was cooled (see FIG. 3), until the solder material had solidified completely (in the exemplary embodiment, approximately 960° C.) Starting from this temperature, accelerated cooling can be brought about by means of blowing in cooling gas, for example nitrogen. The cooling process was controlled in such a manner that the resulting pistons 10, 110 have a ferrite-pearlite structure formation in the AFP steel and a hardness of 230 HB to 300 HB.

In controlling the cooling process, different parameters known to a person skilled in the art must generally be taken into consideration. The simplest thing is the orientation on the basis of so-called time/temperature conversion diagrams (TTC), which are generally made available by the manufacturer of the basic material, as is also the case for the AFP steel 38MnVS6. However, the structure of the vacuum oven and the size, geometry, and number of the work pieces to be processed must also be taken into consideration as significant parameters, because these parameters influence the heat capacities of the work pieces. Physical effects such as heat conduction and heat radiation as well as thermal effects brought about by structural changes also influence the cooling process, because their change over the temperature range, in each instance, is not always linear.

The invention claimed is:

1. Method for the production of a multi-part piston (10, 110) for an internal combustion engine, having the following method steps:
   a) producing an upper piston part (11) and a lower piston part (12) from AFP steel, having an inner support element (22, 26; 122, 126) with joining surfaces (24, 28; 124, 128) and an outer support element (23, 27; 123, 127) with joining surfaces (25, 29; 125, 129), in each instance,
   b) applying a high-temperature solder material based on at least one of nickel, cobalt and copper, over a full area of at least one joining surface (24, 28 or 25, 29; 124, 128 or 125, 129),
   c) joining together the upper piston part (11) and lower piston part (12) to form a piston body, by means of production of contact between the joining surfaces (24, 28 or 25, 29; 124, 128 or 125, 129),
   d) placing the piston body in a vacuum oven and evacuating the vacuum oven,
   e) heating the piston body to a soldering temperature of 1000° C. to 1300° C., at a pressure of at most $10^{-2}$ mbar,
   f) cooling the soldered piston (10, 110) at a pressure of at most $10^{-2}$ mbar and a cooling speed of 1° C/min to 50° C/min, until the high-temperature solder material has solidified completely, in such a manner that the resulting piston has a ferrite-pearlite structure and a hardness of 230 HB to 300 HB.

2. Method according to claim 1, wherein the solder material is introduced into at least one depot depression (33, 133, 135) disposed in the region of at least one joining surface.

3. Method according to claim 2, wherein the at least one depot depression (33, 133, 135) is configured as a circumferential or straight-line groove or as a depression in the shape of a shallow dome.

4. Method according to claim 1, wherein the upper piston part (11) and/or the lower piston part (12) is provided with at least one centering surface (32, 134).

5. Method according to claim 4, wherein the at least one centering surface (32, 134) is provided with solder material.

6. Method according to claim 5, wherein the at least one centering surface (32, 134) hits a joining surface (28, 125) at an angle, and the solder material is applied at an angle.

7. Method according to claim 1, wherein the soldering temperature is kept constant for at least 5 min.

* * * * *